United States Patent [19]

Ohno et al.

[11] Patent Number: 5,061,066

[45] Date of Patent: Oct. 29, 1991

[54] METHOD FOR REALIZING A PRIMARY PHOTOMETRIC STANDARD OF OPTICAL RADIATION USING A PHOTODETECTOR AND PHOTODETECTING APPARATUS THEREFOR

[75] Inventors: Yoshihiro Ohno, Ibaraki; Hideo Nishiyama, Habikino, both of Japan

[73] Assignee: Matsushita Electric Industrial Co., Ltd., Osaka, Japan

[21] Appl. No.: 561,504

[22] Filed: Jul. 30, 1990

[30] Foreign Application Priority Data

Jul. 31, 1989 [JP] Japan ................................. 1-198997

[51] Int. Cl.$^5$ ............................................. G01J 3/51
[52] U.S. Cl. ............................ 356/300; 324/158 D; 356/416; 356/419
[58] Field of Search ............... 356/300, 402, 416, 418, 356/419, 225; 324/158 D

[56] References Cited

U.S. PATENT DOCUMENTS 4,467,438  8/1984  Zerlaut et al. .................... 356/405
4,609,291  9/1986  Takahashi ......................... 356/418

OTHER PUBLICATIONS

Silicon Photodiode Absolute Spectral Response Self-Calibration, Applied Optics, vol. 19, No. 8, Apr. 15, 1980, pp. 1214-1216.

*Primary Examiner*—F. L. Evans
*Attorney, Agent, or Firm*—Wenderoth, Lind & Ponack

[57] ABSTRACT

In a first method for realizing a photometric standard based on a responsivity for a photometric quantity, there is measured an output current from a photodetector of a photometric standard photodetecting apparatus by projecting monochromatic lights having predetermined radiation illuminances at respective wavelengths within the visible region onto the photodetector, both through an optical filter for the spectral luminous efficacy and directly without the optical filter. A responsivity of the photometric standard photodetecting apparatus is calculated by measuring an apparent spectral transmittance of the optical filter from the measured output current. In a second method for realizing a photometric standard, there is measured an output current outputted from a photodetector of a photometric standard photodetecting apparatus by projecting a beam of light from a light source having a predetermined relative spectral distribution onto the photodetector, both through the optical filter and directly without the optical filter. A responsivity of the photometric standard photodetecting apparatus is calculated from the measured output currents without measuring the spectral transmittance of the optical filter.

5 Claims, 2 Drawing Sheets

METHOD FOR REALIZING A PRIMARY PHOTOMETRIC STANDARD OF OPTICAL RADIATION USING A PHOTODETECTOR AND PHOTODETECTING APPARATUS THEREFOR

BACKGROUND OF THE INVENTION

1. Field of the Invention

The present invention relates to a method for realizing a primary photometric standard of optical radiation and a photodetecting apparatus therefor, more particularly, to a method for realizing a primary photometric standard of a photometric unit such as cd, 1m using a photodetector, and a photodetecting apparatus therefor.

2. Description of Related Art

Conventionally, the primary standard of the photometric units is realized by using a black body furnace made based on the Planck's law of radiation, an absolute radiometer for measuring an optical power by substituting the optical power with an electric power, or a synchrotron. In these methods, in order to measure an optical power with an accuracy high enough for a primary standard, it is necessary to provide a large-scale equipment and a high technique, and it can be performed only in the national research organizations.

However, recently, there has been developed a method for measuring an absolute responsivity of a semiconductive photodetector such as a silicon photodiode with a high precision by a relatively simple technique based on a physical study of the semiconductor (See a reference : Applied Optics Vol. 19, No. 8, 1980, pp1214). This method is called "the self-calibration method using a silicon photodiode".

In the self-calibration method using the silicon photodiode, an absolute responsivity [A/W] of the silicon photodiode is obtained by measuring the surface reflectance and the internal quantum efficiency of the silicon photodiode, and it is confirmed that a high accuracy in the order of 0.1% is obtained by this method using a comparatively simple equipment. It has been supposed that the aforementioned self-calibration method using the silicon photodiode is promising as a new method for realizing the primary photometric standard of optical radiation.

However, since the conventional self-calibration method is fundamentally the method for obtaining the absolute responsivity [A/W] at one wavelength of a monochromatic light by projecting the monochromatic light onto the silicon photodiode, in order to realize the photometric standard, it is necessary to measure the absolute responsivity $R(\lambda)$ over the entire visible region using the self-calibration method. After measuring the absolute responsivity $R(\lambda)$, there can be calculated the responsivity $R_{LF}$ [A/1m] for the photometric quantity using the following equation by combination of the silicon photodiode and an optical filter for the spectral luminous efficacy correction whose spectral transmittance $\tau(\lambda)$ has been accurately measured, resulting in a photometric standard.

$$R_{LF} = \frac{\int_0^\infty P(\lambda) \cdot R(\lambda) \cdot \tau(\lambda) \, d\lambda}{K_m \cdot \int_0^\infty P(\lambda) \cdot V(\lambda) \, d\lambda} \quad \text{[A/1m]} \quad (1)$$

where $P(\lambda)$ is a relative spectral distribution of a light source to be measured.

$V(\lambda)$ is a standard spectral luminous efficiency, and $K_m$ is a maximum spectral luminous efficacy (683 [1m/W]).

Further, when a photodetecting apparatus for realizing a primary photometric standard of optical radiation (referred to as a photometric standard photodetecting apparatus hereinafter) is constituted by combining the combination of the aforementioned photodiode and the filter for the spectral luminous efficacy correction with an aperture having an aperture dimension Aa [m$^2$], an responsivity [A/1x] for a photometric quantity (1x) can be calculated using the following equation:

$$R_{LF} = \frac{Aa \int_0^\infty P(\lambda) \cdot R(\lambda) \cdot \tau(\lambda) \, d\lambda}{K_m \int_0^\infty P(\lambda) \cdot V(\lambda) \, d\lambda} \quad \text{[A/1x]} \quad (2)$$

Thereafter, a photometric standard of optical standard can be realized by calculating an illuminance of the photodiode on a photodetecting surface thereof.

As described above, the absolute responsivity can be calculated with a high precision of an order of 0.1% by the self-calibration method, however, it is necessary to measure the spectral transmittance $\tau(\lambda)$ of the filter for the spectral luminous efficacy correction with a high precision similar to that of the absolute responsivity since the error in the measured spectral transmittance $\tau(\lambda)$ thereof propagates to the calculated absolute responsivity, directly. Generally, the spectral transmittance $\tau(\lambda)$ can be measured easily using a spectrophotometer, however, the precision of the measurement generally is only about 1%. In order to measure the spectral transmittance $\tau(\lambda)$ of the optical filter with a higher precision, it is necessary to provide another extra measuring instrument.

Further, generally, there is nonuniformity of the transmittance depending on the position on the surface of the optical filter. Therefore, it is necessary to measure the transmittance of the exact portion of the optical filter through which the incident light actually passes when the optical filter is incorporated in the photodetecting apparatus. Otherwise, there may be caused an error in the measured transmittance of the optical filter. Since the diameter of the beam is predetermined in a general spectrophotometer, it is extremely difficult to measure the spectral transmittance of the optical filter under the aforementioned conditions.

Further, even if the spectral transmittance thereof is measured with a high precision taking the aforementioned conditions into considerations, there is such a problem that an apparent transmittance of the optical filter for the spectral luminous efficacy correction increases due to an interreflection caused between the photodetecting surface of the photodiode and the optical filter when the optical filter is mounted in the photometric standard photodetecting apparatus, resulting in an error in the calculated absolute responsivity for the photometric quantity.

SUMMARY OF THE INVENTION

An essential object of the present invention is to provide a method for realizing a primary photometric standard of a photometric unit, which is capable of measuring a responsivity of a detector for a photometric quantity with a precision higher than that of the conventional method.

Another object of the present invention is to provide a method for realizing a primary photometric standard of a photometric unit, which is capable of measuring a responsivity of a detector for a photometric quantity without any error in the measured responsivity due to the nonuniformity of the optical filter for the spectral luminous efficacy correction and without any error therein due to the interreflection caused between the optical filter for the spectral luminous efficacy correction and the photodetecting surface of the photodiode.

A further object of the present invention is to provide a method for realizing a primary photometric standard of a photometric unit, which is capable of measuring a responsivity of a detector for a photometric quantity with a precision higher than that of the conventional method, without measuring the spectral transmittance $\tau(\lambda)$ of the optical filter for the spectral luminous efficacy correction.

A still further object of the present invention is to provide a photometric standard photodetecting apparatus for realizing a primary photometric standard of a photometric unit, which is capable of measuring a responsivity of a detector for a photometric quantity with a precision higher than that of the conventional method.

In order to accomplish the above objects, according to a first method of one aspect of the present invention, in the case that an optical filter for the spectral luminous efficacy correction is removed from a photometric standard photodetecting apparatus, there is measured an output current $I_0(\lambda)$ outputted from a photodiode of a photometric standard photodetecting apparatus at respective wavelengths $\lambda$ of monochromatic lights when a beam of monochromatic light having a predetermined radiation illuminance at respective wavelengths $\lambda$ within the visible region is projected onto the photodiode. Thereafter, in the case that the optical filter is incorporated in the photometric standard photodetecting apparatus, there is measured an output current $I_1(\lambda)$ outputted from the photodiode, similarly. Then, the spectral transmittance $\tau(\lambda)$ of the optical filter for the spectral luminous efficacy correction is calculated using the following equation:

$$\tau(\lambda) = \frac{I_1(\lambda)}{I_0(\lambda)} \quad (3)$$

Substituting the calculated spectral transmittance $\tau(\lambda)$ into the aforementioned equation (2) gives a responsivity of the photometric standard photodetecting apparatus with a high precision.

In the aforementioned first method, the responsivity of the photometric standard photodetecting apparatus can be calculated with a high precision since there is not basically caused any error in the calculated responsivity due to the nonuniformity of the transmittance of the optical filter for the spectral luminous efficacy correction, and any error therein due to the interreflection caused between the optical filter for the spectral luminous efficacy correction and the photodetecting surface of the photodetector.

According to a second method of another aspect of the present invention, in the case that an optical filter for the spectral luminous efficacy correction is removed from a photometric standard photodetecting apparatus, there is measured an output current $I_0$ outputted from a photodiode of a photometric standard photodetecting apparatus when a beam of light having a predetermined illuminance is projected from a light source having a relative spectral distribution $P(\lambda)$ onto the photodiode. Thereafter, in the case that the optical filter is incorporated in the photometric standard photodetecting apparatus, there is measured an output current $I_1$ outputted from the photodiode, similarly. Then, the numerator of the equation (1) is replaced as follows:

$$\int_0^\infty P(\lambda) \cdot R(\lambda) \cdot \tau(\lambda) \, d\lambda = \left(\frac{I_1}{I_0}\right) \int_0^\infty P(\lambda) \cdot R(\lambda) \, d\lambda \quad (4)$$

Then, a responsivity for a photometric quantity of the photometric standard photodetecting apparatus is calculated using the equations (1) and (4) without measuring the spectral transmittance $\tau(\lambda)$ of the optical filter for the spectral luminous efficacy correction.

In the aforementioned second method, it is not necessary to measure the spectral transmittance $\tau(\lambda)$ of the optical filter for the spectral luminous efficacy correction, and the responsivity of the photometric standard photodetecting apparatus can be calculated by the measurement of the transmittance of the optical filter for the spectral luminous efficacy correction using a white light source, basically without any error in the calculated responsivity due to the nonuniformity of the transmittance of the optical filter for the spectral luminous efficacy correction, and without any error therein due to the interreflection caused between the optical filter for the spectral luminous efficacy correction and the photodetecting surface of the photodetector.

According to a further aspect of the present invention, there is provided a photometric standard photodetecting apparatus for realizing a photometric standard of optical radiation based on a responsivity for a photometric quantity, comprising:

a photodetector having a predetermined spectral absolute responsivity;

an optical filter detachably mounted in front of said photodetector, said optical filter altering the relative spectral responsivity thereof so as to be approximately a standard relative spectral luminous efficacy; and an aperture arranged in front of said optical filter, said aperture having a predetermined aperture dimension, said photodetector, said optical filter and said aperture being aligned on the optical axis so that a beam of light incident into said photometric standard photodetecting apparatus passes through said aperture and said filter onto said photodetector.

BRIEF DESCRIPTION OF THE DRAWINGS

These and other objects and features of the present invention will become clear from the following description taken in conjunction with the preferred embodiments thereof with reference to the accompanying drawings, in which.

DETAILED DESCRIPTION OF THE PREFERRED EMBODIMENTS

First Preferred Embodiment

A first preferred embodiment according to the present invention will be described below with reference to the attached drawings.

Figure 3:
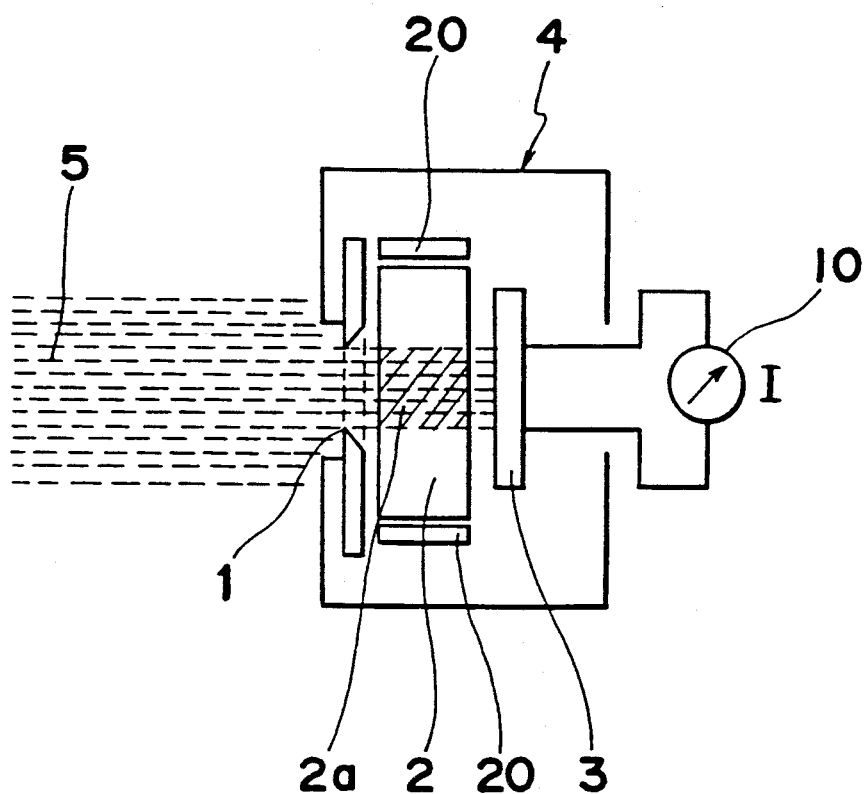
FIG. 3 is a schematic cross sectional view showing a composition of the photometric standard photodetecting apparatus of a preferred embodiment according to the present invention.

FIG. 3 shows a composition of a photometric standard photodetecting apparatus 4 of a preferred embodiment according to the present invention, which is used in methods for calculating a responsivity thereof of the first and second preferred embodiments according to the present invention.

Referring to FIG. 3, there are aligned on an optical axis, an aperture 1 having an aperture dimension Aa [m$^2$], an optical filter 2 for the spectral luminous efficacy correction having a spectral transmittance $\tau(\lambda)$ (referred to as a V($\lambda$)-correction filter hereinafter), and a silicon photodiode 3 having an absolute spectral responsivity R($\lambda$) [A/W], so that a beam of light projected from a light source passes through a predetermined portion 2a of the V($\lambda$)-correction filter 2 which is indicated by oblique lines and is incident onto a photodetecting surface of the silicon photodiode 3. The V($\lambda$)-correction filter 2 alters the relative spectral responsivity thereof so as to be approximately a standard spectral luminous efficiency V($\lambda$), and is detachably mounted in the photometric standard photodetecting apparatus 4 using a fixing member 20. An ampere meter 10 is electrically connected between an anode electrode and a cathode electrode of the silicon photodiode 3, in order to measure an output current I of the silicon photodiode 3.

It is to be noted that the responsivity $R_{LF}$ [A/1x] for a photometric quantity [1x] of the photometric standard photodetecting apparatus 4 is calculated using the aforementioned equation (2).

As shown in FIG. 3, after a beam of light projected from a light source passes through the aperture 1, it passes through the predetermined portion 2a of the V($\lambda$)-correction filter 2. Generally, since there is an nonuniformity of the transmittance depending on a position on the surface of the V($\lambda$)-correction filter 2, there should be measured the transmittance $\tau(\lambda)$ of the predetermined portion 2a thereof through which a beam of light passes practically. Otherwise, there may be caused an error in the calculated responsivity of the photometric standard photodetecting apparatus 4.

Further, a beam of light having passed through the V($\lambda$)-correction filter 2 is incident onto the photodetecting surface of the silicon photodiode 3. Since the photodetecting surface of the silicon photodiode 3 is a mirror surface and it has a mirror surface reflectance in the range from 10% to 40%, a portion of a beam of light incident onto the silicon photodiode 3 is reflected by the photodetecting surface thereof, and is returned to the V($\lambda$)-correction filter 2. A portion of returned light is reflected again by the surface of the V($\lambda$)-correction filter 2, and thereafter, it is incident onto the silicon photodiode 3. Due to such interreflections, the output current I outputted from the silicon photodiode 3 increases since a pseudo transmittance of the V($\lambda$)-correction tion filter 2 becomes larger than real one thereof, resulting in an error in the calculated responsivity $R_{LF}$ of the photometric standard photodetecting apparatus 4.

Figure 1A:
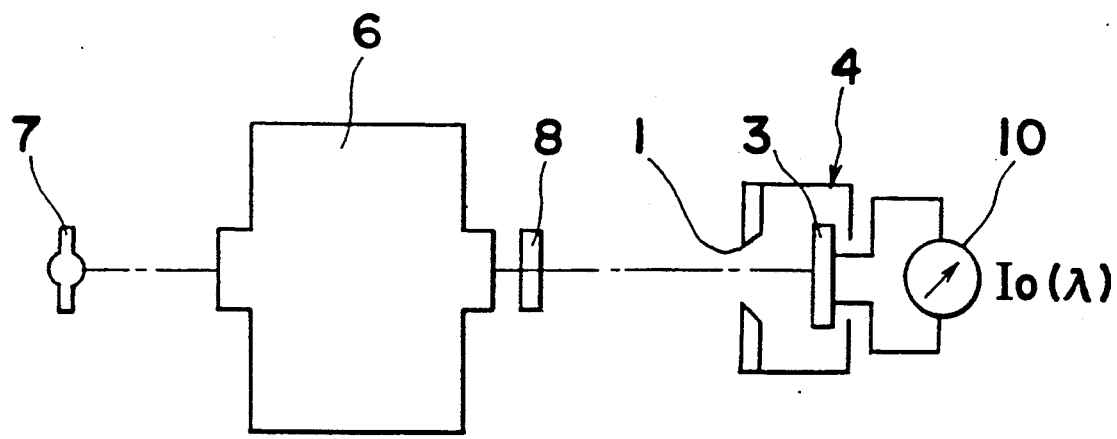
FIGS. 1a and 1b are schematic diagrams showing a method for measuring a spectral transmittance $\tau_d(\lambda)$ of an optical filter for the spectral luminous efficacy correction using a photometric standard photodetecting apparatus shown in FIG. 3, of a first preferred embodiment according to the present invention.
Figure 1B:
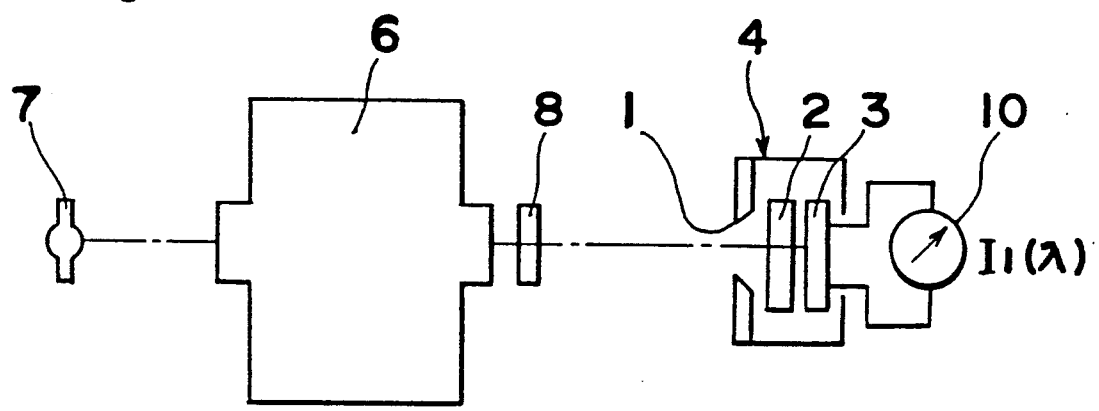

In order to overcome the aforementioned problems, there is used a measuring system shown in FIGS. 1a and 1b for measuring a spectral transmittance $\tau_d(\lambda)$ of the V($\lambda$)-correction filter 2.

Referring to FIGS. 1a and 1b, there are aligned on the optical axis, a white light source 7 a monochromator 6, a diffuser plate 8, and the photometric standard photodetecting apparatus 4 shown in FIG. 3. After a beam of light projected from the light source 7 passes through the monochromator 6, it is diffused by the diffuser plate 8, and then, the diffused monochromatic light of each respective wavelength in the visible region is incident into the photometric standard photodetecting apparatus 4.

First of all, as shown in FIGS. 1a, in such a state that the V($\lambda$)-correction filter 2 is removed from the photometric standard photodetecting apparatus 4, a beam of monochromatic light of each respective wavelength in the visible region is incident into the photometric standard photodetecting apparatus 4, and then, it passes through the aperture 1, and is incident onto the photodetecting surface of the photodiode 3. Then, there is measured using the ampere meter 10, an output current $I_0(\lambda)$ at each respective wavelength which is outputted from the silicon photodiode 3.

Thereafter, as shown in FIG. 1b, in such a state that the V($\lambda$)-correction filter 2 is mounted using the fixing member 20 in the photometric standard photodetecting apparatus 4, there is measured an output current $I_1(\lambda)$ at each respective wavelength which is outputted from the silicon photodiode 3, similarly.

Then, an effective spectral transmittance $\tau_d(\lambda)$ of the V($\lambda$)-correction filter 2 is expressed by the following equation:

$$\tau_d(\lambda) = \frac{I_1(\lambda)}{I_0(\lambda)} \tag{5}$$

Since the spectral transmittance $\tau_d(\lambda)$ is measured as the value including the effects caused by the nonuniformity of the transmittance of the V($\lambda$)-correction filter 2 depending on the position on the surface thereof and by the aforementioned interreflection of light, there is no error in the measured spectral transmittance $\tau_d(\lambda)$, basically.

After thus measuring the spectral transmittance $\tau_d(\lambda)$ of the V($\lambda$)-correction filter 2, there is calculated the responsivity $R_{IL}$ of the photometric standard photodetecting apparatus 4 with a high precision by substituting the measured spectral transmittance $\tau_d(\lambda)$ into the aforementioned equation (2).

Second Preferred Embodiment

A second preferred embodiment according to the present invention will be described below with reference to equations and the attached drawings.

When the numerator of the equation (1) is replaced as follows:

$$\int_0^\infty P(\lambda) \cdot R(\lambda) \cdot \tau(\lambda) \, d\lambda = \tau_w \int_0^\infty P(\lambda) \cdot R(\lambda) \, d\lambda \tag{6}$$

$\tau_w$ is expressed by the following equation:

$$\tau_w = \frac{\int_0^\infty P(\lambda) \cdot R(\lambda) \cdot \tau(\lambda) \, d\lambda}{\int_0^\infty P(\lambda) \cdot R(\lambda) \, d\lambda} \tag{7}$$

Namely, $\tau_w$ represents a transmittance of the $V(\lambda)$-correction filter 2 for optical radiation over the entire wavelength region of $P(\lambda)$, which is weighted with $P(\lambda) \cdot R(\lambda)$. The transmittance $\tau_w$ of the $V(\lambda)$-correction filter 2 is measured using a measuring system shown in FIGS. 2a and 2b.

Figure 2A:
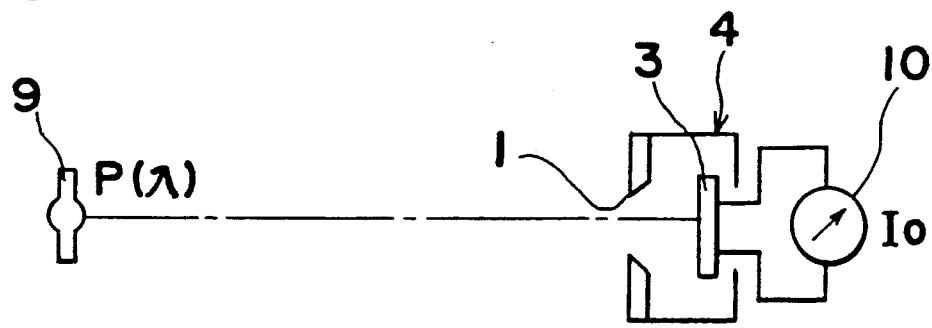
FIGS. 2a and 2b are schematic diagrams showing a method for measuring a spectral transmittance $\tau_w$ of an optical filter for the spectral luminous efficacy correction using the photometric standard photodetecting apparatus shown in FIG. 3, of a second preferred embodiment according to the present invention.
Figure 2B:
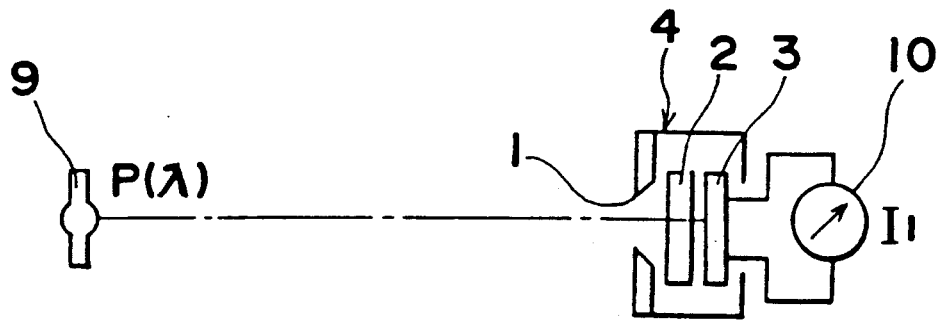

Referring to FIG. 2a and 2b, there are aligned on the optical axis, a white light source 9 having a spectral distribution $P(\lambda)$, and the aperture 1, the $V(\lambda)$-correction filter 2 and the silicon photodiode 3 of the photometric standard photodetecting apparatus 4.

As shown in FIGS. 2a and 2b, a beam of light projected from the white light source 9 is incident through the aperture 1 into the photometric standard photodetecting apparatus 4.

First of all, as shown in FIG. 2a, in such a state that the $V(\lambda)$-correction filter 2 is removed from the photometric standard photodetecting apparatus 4, there is measured using the ampere meter 10, an output current $I_0$ outputted from the silicon photodiode 3.

Thereafter, as shown in FIG. 2b, in such a state that the $V(\lambda)$-correction filter 2 is mounted in the photometric standard photodetecting apparatus 4 using the fixing member 20, there is measured an output current $I_1$ outputted from the silicon photodiode 3, similarly.

Then, the output currents $I_0$ and $I_1$ are expressed by the following equations, respectively:

$$I_0 = \int_0^\infty P(\lambda) \cdot R(\lambda) \, d\lambda \tag{8}$$

$$I_1 = \int_0^\infty P(\lambda) \cdot R(\lambda) \cdot \tau(\lambda) \, d\lambda \tag{9}$$

Therefore, the following equation is obtained from the equations (7) to (9).

$$\tau_w = \frac{I_1}{I_0} \tag{10}$$

After substituting the equation (10) into the equation (6), replacing the numerator of the equation (2) with the equation (6) gives the following relationship:

$$R_{IL} = \frac{A_a \cdot (I_1/I_0) \int_0^\infty P(\lambda) \cdot R(\lambda) \, d\lambda}{K_m \int_0^\infty P(\lambda) \cdot V(\lambda) \, d\lambda} \quad [\text{A/lx}] \tag{11}$$

Since the term of $\tau(\lambda)$ is eliminated in the equation (11), it is not necessary to measure the spectral transmittance $\tau(\lambda)$ of the $V(\lambda)$-correction filter 2, and the responsivity $R_{IL}$ is calculated from the value $\tau_w = I_1/I_0$.

Further, in the aforementioned measurement of the transmittance $\tau_w = I_1/I_0$, there is basically caused no error in the calculated transmittance $\tau_W$ since it is measured as the value including the effects caused by the ununiformity of the transmittance of the $V(\lambda)$-correction filter 2 depending on the position of the surface thereof and by the aforementioned interreflection of light, similarly to the measurement of the spectral transmittance $\tau_d(\lambda)$ of the first preferred embodiment. Accordingly, if there are obtained correct values of the absolute responsivity $R(\lambda)$ of the silicon photodiode 3 and the spectral distribution $P(\lambda)$ of the white light source 9, it is not necessary to measure the spectral transmittance $\tau(\lambda)$ of the $V(\lambda)$-correction filter 2, and there can be calculated the responsivity $R_{IL}$ of the photometric standard photodetecting apparatus 4, correctly.

In the first preferred embodiment, it is necessary to measure the spectral transmittance $\tau(\lambda)$ of the $V(\lambda)$-correction filter 2 at respective wavelengths in the visible region using the monochromator 6 and the diffuser plate 8. On the other hand, it is necessary to obtain the values of $R(\lambda)$ and $P(\lambda)$ only within the visible region or within the transparent wavelength region of $\tau(\lambda)$. The precision of the values of $R(\lambda)$ and $P(\lambda)$ on wavelength regions near and outside the both ends of the visible region hardly influences the precision of the calculated responsivity.

On the other hand, the method of the second preferred embodiment has such an advantage that the transmittance $\tau_w$ of the $V(\lambda)$-correction filter 2 can be measured without the monochromator 6 and the diffuser plate 8. However, it is necessary to measure the absolute responsivity $R(\lambda)$ of the silicon photodiode 3 and the spectral distribution $P(\lambda)$ of the white light source 9 over the entire wavelength region which is predetermined by $R(\lambda)$ and $P(\lambda)$.

As described above, according to the method of the first preferred embodiment of the present invention, in the measurement of the spectral transmittance of the optical filter for the spectral luminous efficacy correction, it is possible to measure the spectral transmittance thereof as the value including the effects caused by the nonuniformity of the transmittance thereof and by the interreflection of light caused between the surface of the optical filter and the photodetecting surface of the silicon photodiode, and there is basically caused no error in the measured transmittance thereof and the calculated responsivity of the photometric standard photodetecting apparatus. Accordingly, there can be obtained the photometric standard photodetecting apparatus which is capable of realizing a photometric standard with a high precision.

Further, according to the method of the second preferred embodiment of the present invention, it is not necessary to measure the spectral transmittance of the optical filter for the spectral luminous efficacy correction, and it is possible to calculate the responsivity of the photometric standard photodetecting apparatus by measuring the transmittance of the optical filter for the spectral luminous efficacy correction using the white light source. Furthermore, there is basically caused no error in the calculated responsivity of the photometric standard photodetecting apparatus. Accordingly, there can be obtained the photometric standard photodetecting apparatus which is capable of realizing a photometric standard with a high precision.

As described above, it has been said that the conventional self-calibration method can calculate the absolute responsivity with a high precision using relatively simple equipments and a relatively simple operation. It becomes possible to easily obtain the practical photometric standard photodetecting apparatus capable of realizing a photometric standard based on the responsivity thereof with a high precision by combining the conventional self-calibration method with the photometric standard photodetecting apparatus of the preferred embodiment according to the present invention.

It is understood that various other modifications will be apparent to and can be readily made by those skilled in the art without departing from the scope and spirit of the present invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which the present invention pertains.

What is claimed is:

1. A method for realizing a photometric standard of optical radiation based on a responsivity for a photometric quantity, using a photometric standard photodetecting apparatus comprising a photodetector having a predetermined absolute spectral responsivity $R(\lambda)$, an optical filter detachably mounted in front of said photodetector, said optical filter altering the relative spectral responsivity thereof so as to be approximately a predetermined standard relative spectral luminous efficacy $V(\lambda)$, and an aperture arranged in front of said optical filter, said aperture having a predetermined aperture dimension Aa, said method including steps:

measuring an output current $I_0(\lambda)$ outputted from said photodetector by projecting monochromatic lights having respective wavelengths within the visible region through said aperture onto said photodetector after removing said optical filter from said photometric standard photodetecting apparatus;

measuring an output current $I_1(\lambda)$ outputted from said photodetector by projecting monochromatic lights having respective wavelengths within the visible region through said aperture and said optical filter onto said photodetector after mounting said optical filter in said photometric standard photodetecting apparatus;

calculating a spectral transmittance $\tau(\lambda)$ using the following equation:

$$\tau(\lambda) = \frac{I_1(\lambda)}{I_0(\lambda)} \text{; and}$$

calculating a responsivity $R_{IL}$ for a photometric quantity using the following equation:

$$R_{IL} = \frac{Aa \int_0^\infty P(\lambda) \cdot R(\lambda) \cdot \tau(\lambda) \, d\lambda}{K_m \int_0^\infty P(\lambda) \cdot V(\lambda) \, d\lambda},$$

where $P(\lambda)$ is a predetermined relative spectral distribution of a light source to be measured, and $K_m$ is a predetermined maximum spectral luminous efficacy (683 [lm/W]).

2. The method as claimed in claim 1, further including a step of obtaining said monochromatic lights having respective wavelengths within the visible region by passing a beam of light projected from a white light source to be measured through a monochromator and a diffuser plate.

3. A method for realizing a photometric standard of optical radiation based on a responsivity for a photometric quantity, using a photometric standard photodetecting apparatus comprising a photodetector having a predetermined absolute spectral responsivity $R(\lambda)$, an optical filter detachably mounted in front of said photodetector, said optical filter altering the relative spectral responsivity thereof so as to be approximately a predetermined standard relative spectral luminous efficacy $V(\lambda)$, and an aperture arranged in front of said optical filter, said aperture having a predetermined aperture dimension Aa, said method including steps:

measuring an output current $I_0$ outputted from said photodetector by projecting a beam of light having a predetermined illuminance from a light source having a predetermined relative spectral distribution $P(\lambda)$ through said aperture onto said photodetector after removing said optical filter from said photometric standard photodetecting apparatus;

measuring an output current $I_1$ outputted from said photodetector by projecting a beam of light from said light source through said aperture and said optical filter onto said photodetector after mounting said optical filter in said photometric standard photodetecting apparatus; and calculating a responsivity $R_{IL}$ for a photometric quantity using the following equation:

$$R_{IL} = \frac{Aa \, (I_1/I_0) \int_0^\infty P(\lambda) \cdot R(\lambda) \, d\lambda}{K_m \int_0^\infty P(\lambda) \cdot V(\lambda) \, d\lambda},$$

where $K_m$ is a predetermined maximum spectral luminous efficacy (683 [lm/W]).

4. A photometric standard photodetecting apparatus for realizing a photometric standard of optical radiation based on a responsivity for a photometric quantity, comprising:

a photodetector having a predetermined spectral absolute responsivity;

an optical filter detachably mounted in front of said photodetector, said optical filter altering the relative spectral responsivity thereof so as to be approximately a standard relative spectral luminous efficacy; and an aperture arranged in front of said optical filter, said aperture having a predetermined aperture dimension, said photodetector, said optical filter and said aperture being aligned on the optical axis so that a beam of light incident into said photometric standard photodetecting apparatus passes through said aperture and said filter onto said photodetector.

5. The apparatus as claimed in claim 4, wherein said photodetector is a silicon photodiode.

* * * * *